April 6, 1937.  O. L. STARR ET AL  2,076,009
MOTOR VEHICLE
Filed May 28, 1932   12 Sheets-Sheet 7

INVENTORS.
Oscar L. Starr
Harmon S. Eberhard
BY
ATTORNEY.

April 6, 1937.　　O. L. STARR ET AL　　2,076,009
MOTOR VEHICLE
Filed May 28, 1932　　12 Sheets-Sheet 12

INVENTORS.
Oscar L. Starr
Harmon S. Eberhard
BY
ATTORNEY.

Patented Apr. 6, 1937

2,076,009

UNITED STATES PATENT OFFICE 2,076,009

MOTOR VEHICLE

Oscar L. Starr, Mission San Jose, and Harmon S. Eberhard, San Leandro, Calif., assignors to Caterpillar Tractor Co., San Leandro, Calif., a corporation of California Application May 28, 1932, Serial No. 614,158

14 Claims. (Cl. 180—9.1)

Our invention relates to motor vehicles, and particularly to a high-clearance tractor adapted for the cultivation of row crops.

An object of our invention lies in the provision of a vehicle of the character described, which can be economically and readily constructed.

Another object is the provision of adapter mechanism, whereby a low-clearance tractor of a given type can be readily converted to the high-clearance type of tractor, with minimum time, expense, and labor; and whereby the high-clearance tractor can be constructed from essential parts of the low-clearance tractor, thus resulting in great manufacturing economy.

Another object of our invention is the provision of adapter mechanism, of the character described, composed of relatively few and simple parts.

Another object is the provision of a tractor body construction, which is adapted to be employed as a unit in either the low-clearance or high-clearance tractor, thus enabling manufacture of both tractors with great economy.

Another object lies in the provision of a high-clearance wide-gauge tractor, which can be economically manufactured along with the narrower-gauge high-clearance tractor and by utilizing said body unit.

Another object is the provision of attachment mechanism whereby the narrower-gauge tractor can be readily converted to the wider-gauge tractor.

Another object lies in the attainment of the foregoing objects, in a track-type tractor.

Another object is the provision of an improved final drive and an improved final drive mounting for a track-type tractor.

Another object is the provision of an improved truck hinge mounting for a track-type tractor.

Other objects of the invention will become apparent from a perusal of the following description.

Description of figures

Fig. 16 is an enlarged fragmentary sectional view, illustrating the high-clearance tractor quill and sprocket wheel mounting, shown in Fig. 3.

Introduction

In the cultivation of row crops, such as corn and cotton, it is extremely desirable to utilize a tractor with clearance sufficient to pass over a crop row or rows without damaging the plants. Tractors of the track-type have been built that are of insufficient clearance for this purpose to which the high-clearance tractor of our invention is particularly adapted. The adaption of a low-clearance tractor, particularly a track-type tractor of comparatively small horsepower, to a high-clearance tractor of the same general character involves quite a manufacturing problem, if this change is to be made with minimum expense, time, and labor. Our invention, therefore, is primarily directed to making this change with economy by utilizing a unit construction common to both the high-clearance and the low-clearance tractor; so that both tractors can be manufactured at substantially the same cost. Furthermore, our invention is designed to provide a low-clearance tractor, particularly of the track-type, of such construction that it can be readily converted to a high-clearance tractor, by one who has already purchased the low-clearance tractor. Also, in case it is desired to utilize a tractor capable of straddling a larger number of crop rows of a given spacing, while the crops are being cultivated, we have provided adapter means whereby the high-clearance tractor can be readily changed to a wider gauge with extreme economy; and whereby tractors of different gauge can be economically manufactured from units common to all types.

So that an understanding of our invention may be facilitated, it is thought desirable, first, to describe the low-clearance tractor, including the unit common to both types of tractors.

LOW-CLEARANCE TRACTOR (SHEETS 6, 8, 9, AND 10) (NUMERALS BELOW 199)

*Main frame and drive*

Figure 1:
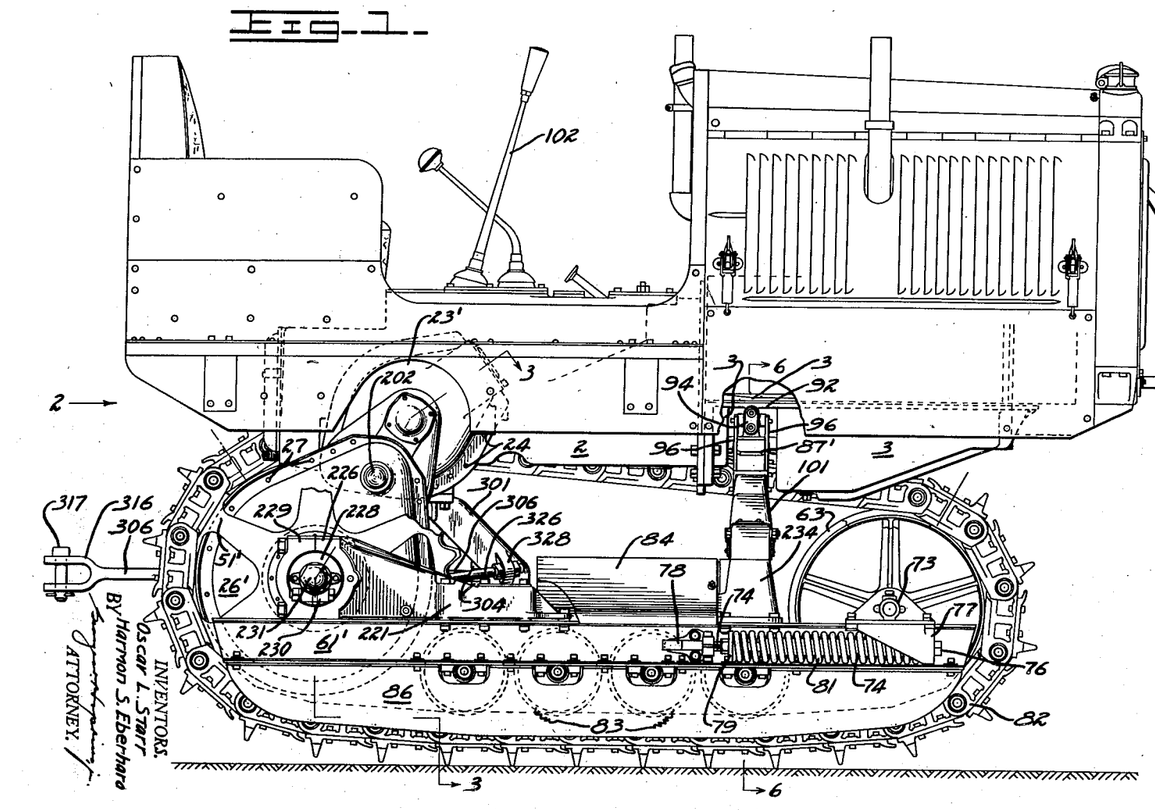
Fig. 1 is a side elevational view of the high-clearance tractor. Parts of the structure are broken away and portions thereof are omitted from the view, to disclose clearly the construction.
Figure 2:
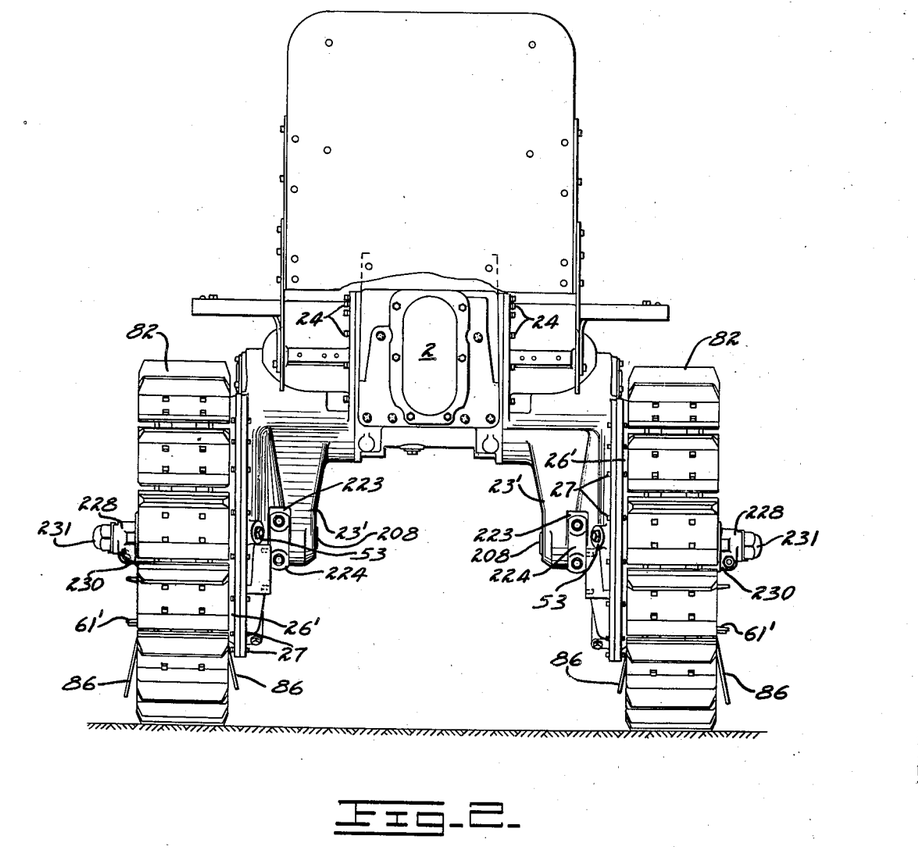
Fig. 2 is a rear end elevation of the tractor, looking in the direction of arrow 2 in Fig. 1.

The low-clearance tractor is of the track type, in which the main frame consists essentially of an elongated, rigid transmission case, provided with suitable internal reinforcing means, rigidly secured by suitable means to the rear end of the engine structure. This frame, which forms a unitary, rigid, and sturdy backbone for the tractor, is common to both types. It is most clearly shown in Fig. 1 wherein the elongated transmission case is indicated by reference character 2, and the engine structure by reference character 3.

Figures 4, 5:
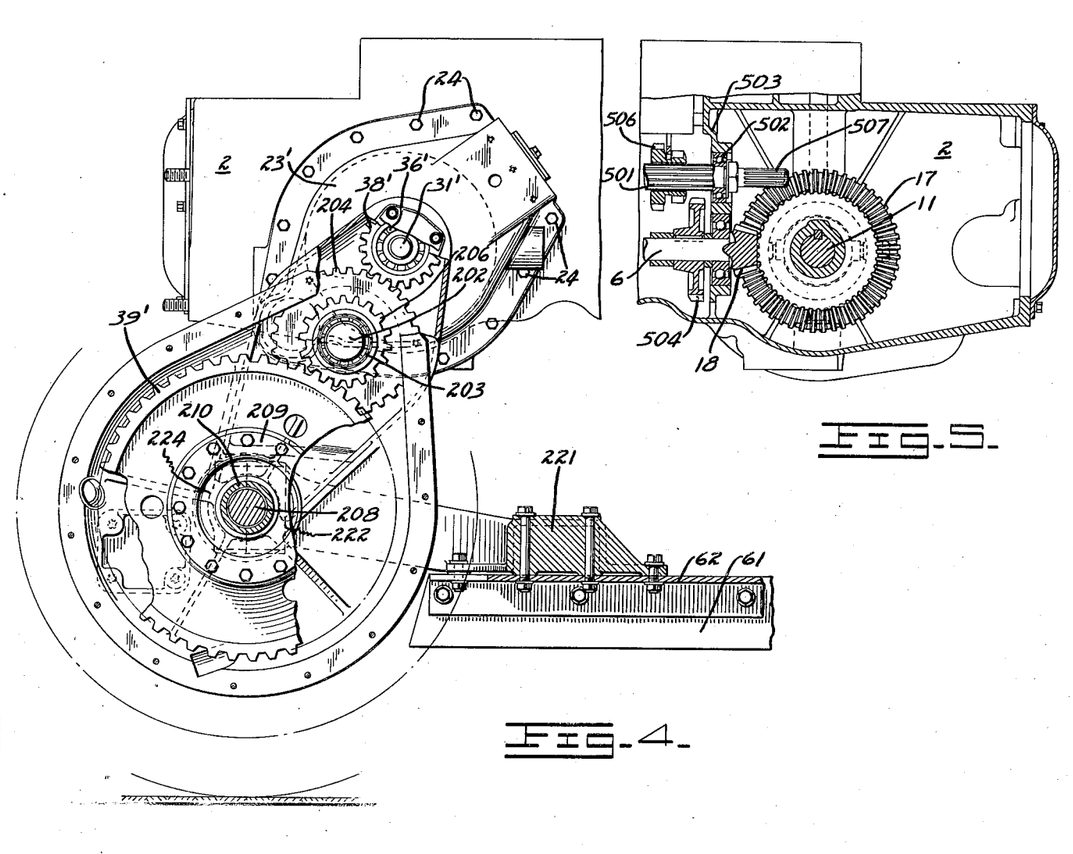
Fig. 4 is a sectional side elevation taken in a plane indicated by the line 4—4 of Fig. 3. A part of the structure is omitted from the view to disclose the construction.
Fig. 5 is a sectional view, taken in a plane indicated by line 5—5 of Fig. 3, illustrating the terminal arrangement of the drive shaft.
Figure 11:
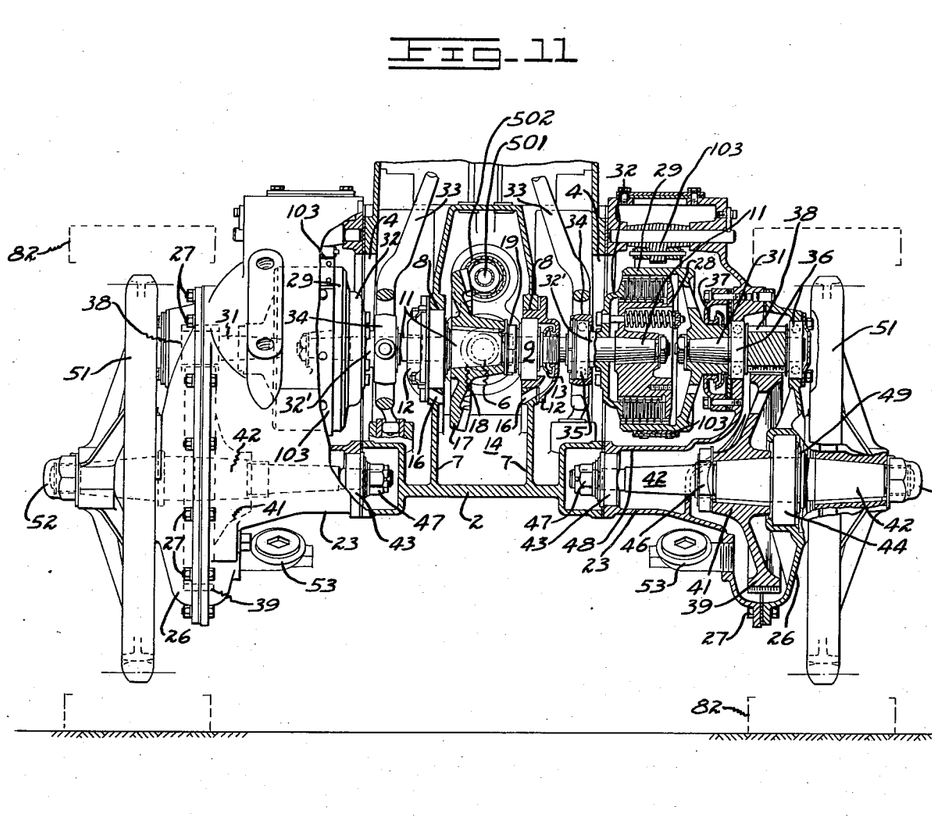
Fig. 11 is a sectional elevation taken in a plane indicated by line 11—11 in Fig. 10.

With particular reference to Fig. 11, the rear end of the transmission case is formed with side apertures 4. A drive shaft 6 is mounted longitudinally in the transmission case, which drive shaft is driven through the usual speed change transmission gearing mounted on the drive shaft and splined on a shaft mounted thereabove. Spaced vertical reinforcing webs 7 are formed integral with the transmission case, adjacent the rear terminal of the drive shaft 6; and these webs have apertures 8, in which are located bearings 9 for the cross shaft 11. The ends of cross shaft 11 extend through apertures 4 in the transmission case; cages 12 (mounted in apertures 8 and seating bearings 9) and rotary oil throwers 13 (mounted within the cages and on shaft 11), serving to prevent the passage of oil out of housing 14 formed between webs 7. Passages 16, communicating with the interior of cages 12, allow the oil, which flows past bearings 9, to return into housing 14. A bevel gear 17, meshing with a pinion 18 on drive shaft 6 (Figs. 5 and 11), is keyed to a tapered portion of cross shaft 11 and is held in place by suitable locking means 19. From the preceding description, it is seen that power is transmitted from the motor to the drive shaft 6, so as to cause rotation of cross shaft 11.

*Final drive gear housing*

Each final drive gear housing and mechanism therein are the same for both sides of the tractor. The housing comprises a casing 23, rigidly secured to the transmission case by bolts 24 (Fig. 12) surrounding apertures 4, and also comprises a cover 26, secured by bolts 27 to the casing. An end portion of cross shaft 11 projects into the casing; and on the portion, is secured clutch member 28 provided with suitable clutch plates. Clutch member 28 cooperates with a clutch member 29, keyed to stub shaft 31 aligned with cross shaft 11. Clutch member 29 carries clutch plates interposed between the plates on clutch member 28, so that when the clutch plates are pressed together, stub shaft 31 is caused to rotate with cross shaft 11. The clutch plates are normally held together by spring-pressed shiftable pressure plate 32, having an inwardly-projecting hub $32^1$ and slidable along cross shaft 11. Shifting of the pressure plate, to release the clutch, is obtained by means of yoke member 33, which is pivotally mounted in the bottom of the transmission case. Yoke 33 is provided with means pivotally connected to bearing cage 34, surrounding and locked to the hub $32^1$ and containing bearing 35, in which bearing hub $32^1$ is journaled. The clutch structure is for the purpose of steering the tractor in a manner to be later described.

Stub shaft 31 is journaled in spaced bearings 36, one mounted in the outer wall of casing 23 and the other in cover 26; a sealing structure 37, similar to the seal adjacent bearing 9, being provided to maintain the clutch dry. A pinion 38, between bearings 36, is formed integral with stub shaft 31 and meshes with final drive gear 39. Final drive gear 39 is formed with a tapered hub 41, keyed to a complementary tapered portion of rotatable sprocket wheel shaft 42. Shaft 42 extends through the final drive gear housing, formed by casing 23 and cover 26, and is journaled in a bearing 43, mounted adjacent the inner side of the casing, and in the bearing 44 mounted in cover 26. The final drive gear 39 is held in fixed position on shaft 42, by lock nut 46; and the shaft 42 is held at its inner end by lock nut 47. It is to be observed that the clutch structure is also kept dry by transverse partition wall 48, integral with casing 23, and forming a housing for the inner end of shaft 42 as well as reinforcing the structure. A suitable seal 49 is employed to prevent the entrance of deleterious matter into the final drive gear housing. Sprocket wheel 51, held in place by lock nut 52, is keyed to the outer end portion of shaft 42, and drives the tractor by engaging the track chain, in a manner to be subsequently described. To allow for the introduction and draining of grease, grease fitting 53 is secured adjacent the bottom of the final drive gear housing.

*Truck frame*

Truck frames are utilized, pivotally connected to the tractor adjacent the rear end, and which carry supporting means for the track and also provide a mounting for a transverse equalizer bar or spring adjacent the front of the tractor. As the truck frame construction and pivotal mounting therefor are the same for each side of the tractor, only one side will be described.

Figure 7:
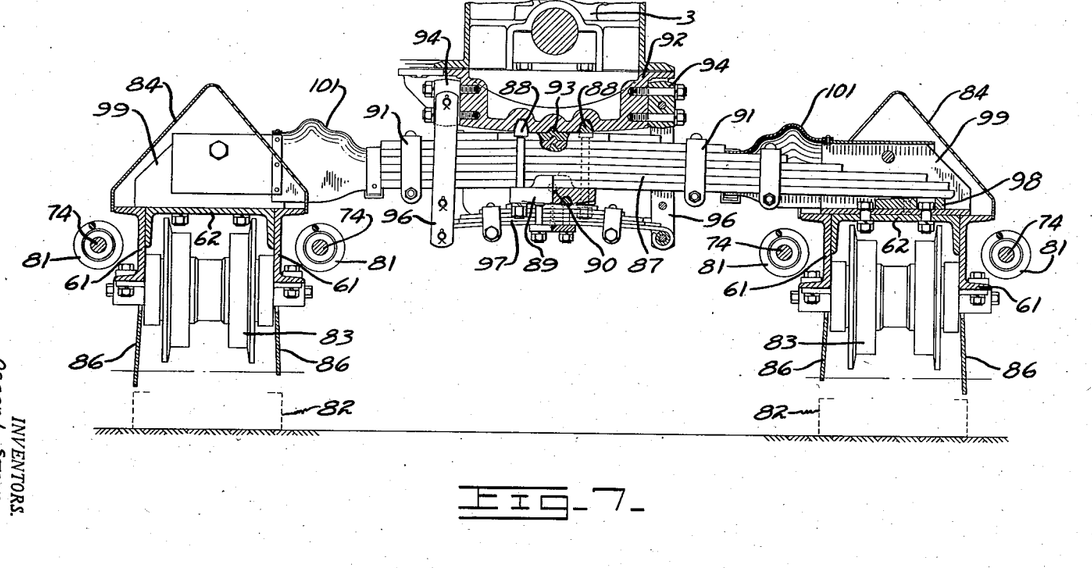
Fig. 7 is a view similar to that of Fig. 6, but showing the equalizer bar of the low-clearance tractor.
Figure 10:
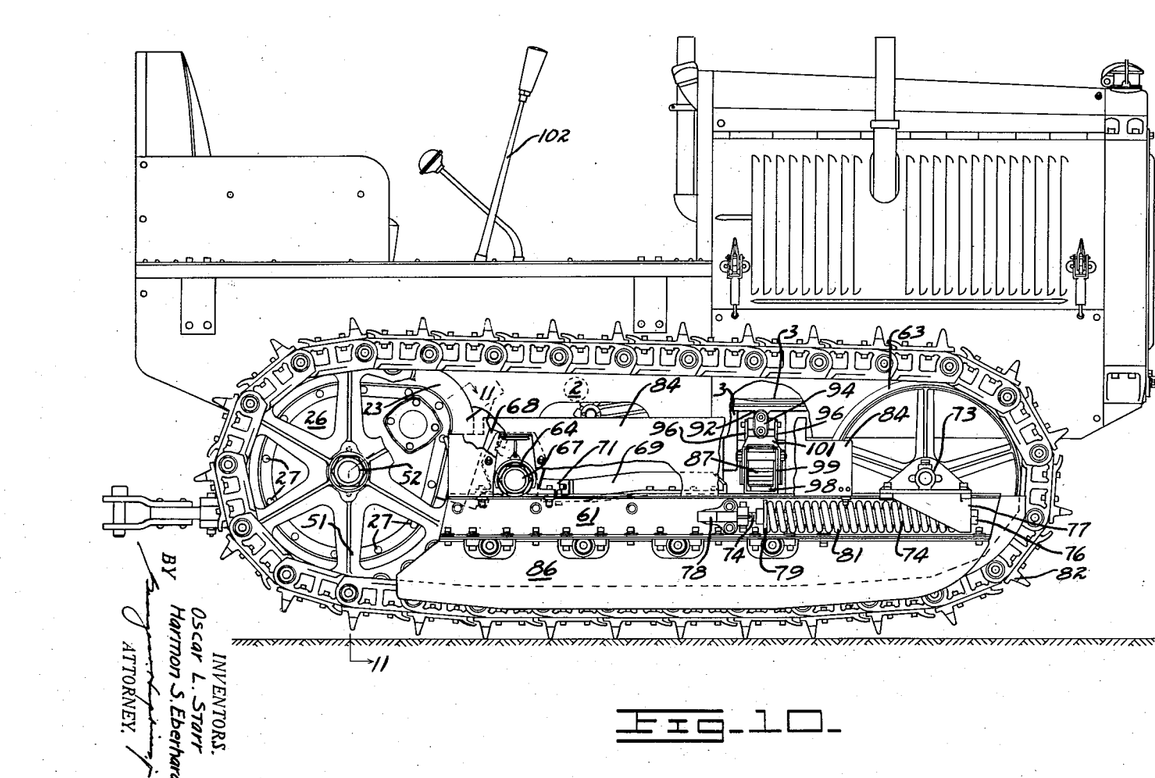
Fig. 10 is a side elevational view, similar to that of Fig. 1, but illustrating the low-clearance tractor which is capable of being converted to the high-clearance tractor of Fig. 1.
Figures 12, 13:
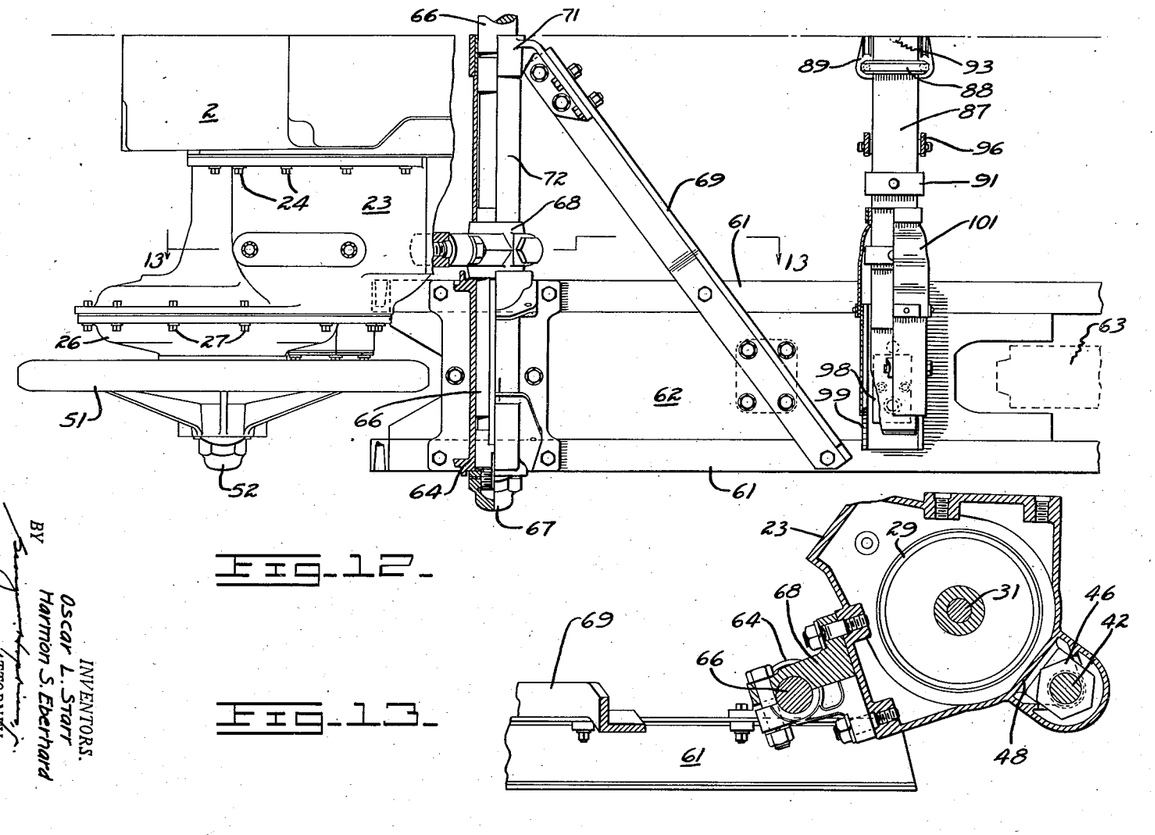
Fig. 12 is a plan view, partly in section, illustrating the truck mounting of the low-clearance tractor illustrated in Fig. 10.
Fig. 13 is a fragmentary sectional view, taken in a plane indicated by line 13—13 in Fig. 12.

With particular reference to Figs. 7, 10, and 12, the truck frame, at each side of the tractor, comprises a pair of spaced side channels 61 secured to a top channel 62 positioned therebetween. Top channel 62 is notched at the front and rear ends thereof to provide clearance for the front idler wheel 63 and sprocket wheel 51, respectively. Adjacent the rear end and in front of the sprocket wheel, the truck is provided with a bearing 64 in which is journaled pivot shaft 66; a lock nut 67 threaded over the end thereof holding the truck frame on the shaft. Clamp member 68, adjacent the inner side of the truck frame, is secured to pivot shaft 66 and to the final drive gear housing (Fig. 13). Suitable bracing means is employed, comprising diagonally positioned angle 69, fastened at the outer end to the truck channels, and secured to bearing 71 at the inner end; in which bearing, pivot shaft 66 is also journaled. Reinforcing tubular spacer 72 is positioned between bearing 71 and clamp member 68. It is to be noted that pivot shaft 66 extends over both truck frames at each side of the tractor, and that each truck frame and its brace can pivot independently about the pivot shaft.

Track

Idler wheel 63 (Fig. 10) is journaled in bearing 73 slidably mounted on the truck frame. Forward motion of bearing 73 is limited by rod 74 having a head 76, at the front end, adapted to abut flange 77 movable with the bearing, through which flange the rod passes. Rod 74 is threaded, at its rear end, and is secured in bracket 78 fastened to the channel member 61. A collar 79 is threaded on rod 74; and a coiled compression spring 81, about rod 74, is positioned between collar 79 and flange 77 to yieldingly maintain bearing 73, and, consequently, the idler wheel in forward position. Tension of compression spring 81 can be adjusted by turning collar 79. Compression springs and the described correlated structure are located at each side of each truck frame, as indicated in Fig. 7.

The track 82 includes an endless sprocket chain passing over idler 63 and sprocket wheel 51; and the sprocket wheel engaging the chain drives the tractor. The tractor travels over, and is supported on the under reach of the track as it is laid, by rollers 83 (Fig. 7) journaled between channels 61. It is to be noted that proper tension is maintained on the track, due to the resilient positioning of idler 63; and in case the track should become clogged with dirt or other foreign matter, the idler 63 will yield until the dirt is ejected from the track. To protect the structure against foreign matter, such as dirt, fender 84 is mounted over the truck, and depending fenders 86 are fastened on each side of the truck.

Equalizer spring

The forward portion of the tractor rests upon an equalizer spring 87, which comprises a plurality of leaves, forming a substantially flat structure (Fig. 7). U-bolts 88, fastened to the flanged plate 89 upon which the spring rests between the flanges, hold the leaves together at the central portion thereof; a retaining ball 90 being seated in the under leaf of the spring and in the plate. Similar U-shaped clamping members 91 are positioned along the length of the spring. Crankcase oil pan 92 rests upon the top of the spring, and is recessed to accommodate the heads of U-bolts 88. It is to be observed that the leaves of the spring are dovetailed as at 93 to prevent endwise shifting thereof. Secured to the sides of the crankcase oil pan 92 are brackets 94, carrying depending shackles 96 pivotally connected thereto; the shackles being also pivotally connected to an auxiliary spring 97 upon which plate 89 rests.

The ends of equalizer spring 87 rest on shoes 98 and are held by means of channels 99, both the shoes and the channels being secured to the truck frames. Boot assemblies 101 are utilized for protecting the ends of the spring against foreign matter.

Operation

From the preceding description, it is apparent that, as the tractor travels over rough ground, each of the truck frames can swing independently about the pivot shaft. At the same time, since the ends of the equalizer spring are loosely mounted on the trucks, movement thereof will obtain, and this coupled with the flexibility of the spring, will allow movement of the tractor over rough ground without placing undue strain on structural parts. If it is desired to steer the tractor in one direction or the other, it is only necessary to release the desired steering clutch by shifting pressure plate 32. This can be done by a suitable operating lever 102, convenient to the driver and connected to yoke 33. Two operating levers 102 are provided, one for each of the steering clutches. In order to lock the track when a clutch is released and sharp turning is desired, we provide a suitable clutch brake 103 acting on the sprocket wheel side of the clutch (Fig. 11), which brake can be operated by a foot pedal accessible to the driver of the tractor. Also, two brakes are provided, one for each of the steering clutches.

NARROW-GAUGE HIGH-CLEARANCE TRACTOR (SHEETS 1, 2, 3, 4, 5, 7, AND 11) (200–249 SERIES NUMERALS)

The construction of the high-clearance tractor is the same as that of the low-clearance tractor, insofar as the vital parts of both types of tractors are concerned. This common structure, including the transmission case rigidly secured to the power plant, and the transmission, controls and drive means in the transmission case, forms the living part of the tractor which may be aptly called the torso. The tractor torso is, therefore, a backbone unit for both types of tractors and provides the base from which the various types may be constructed with great economy, by the use of special attachments. Such attachments are adapted to replace parts of the low-clearance tractor, to allow for economical manufacture of both types of tractors and for ready change from one type of tractor to the other. We shall, therefore, describe the high-clearance tractor, chiefly with respect to the differences in structure between the two vehicles.

Main frame and drive

In the high-clearance tractor, the cross shaft 11 is the same as that of the low-clearance tractor. However, from a comparison of Figs. 3 and 11, it is to be observed that the cross shaft is mounted in a reverse position and that bevel gear 17 is, therefore, also in a reverse position. The reason for this will be subsequently explained.

Final drive gear housing

Figure 3:
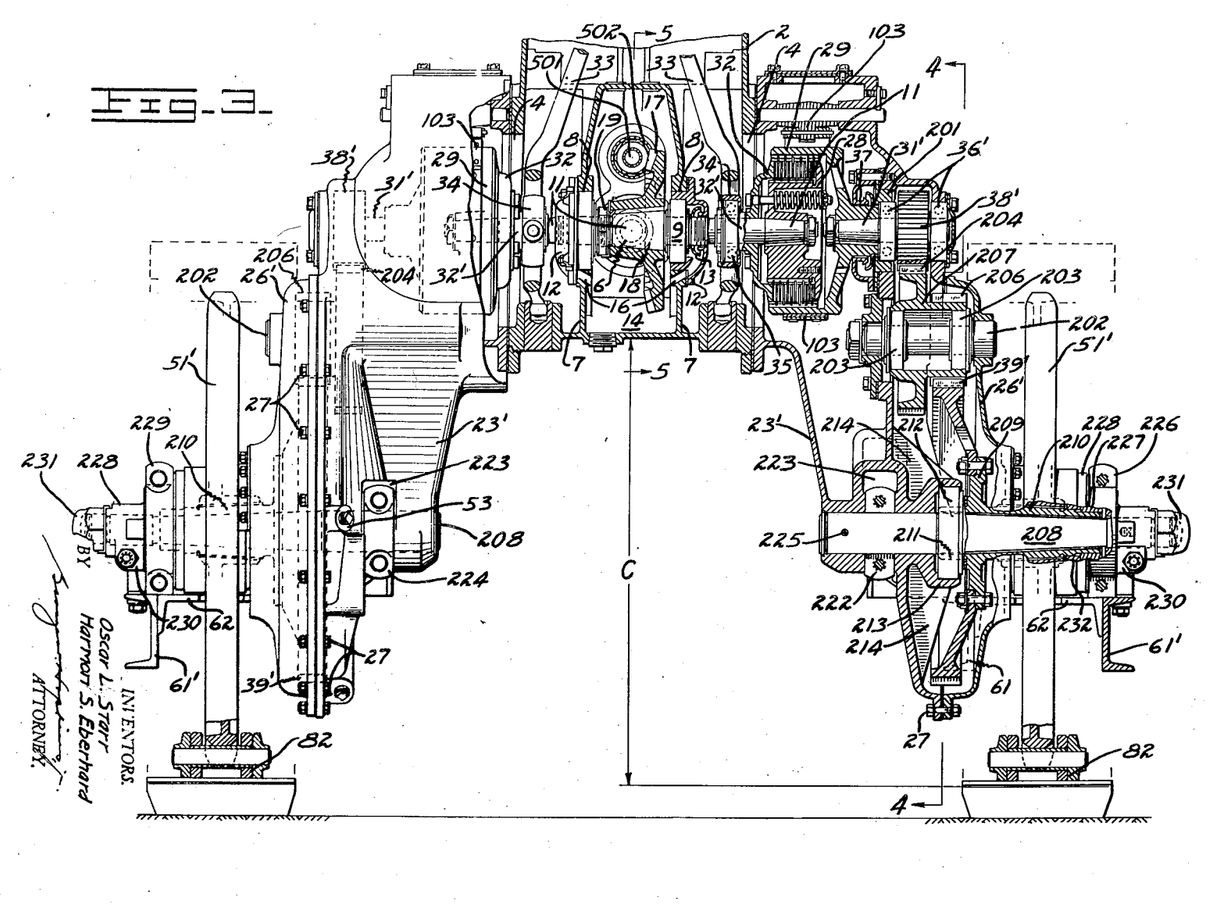
Fig. 3 is a sectional elevation of the final drive assembly, taken in a plane indicated by line 3—3 of Fig. 1. Portions of the structure are omitted from the view and portions are shown diagrammatically in dotted lines, to illustrate more clearly the construction.

Casing 23¹ of the high-clearance tractor, as seen from Fig. 3, is vertically longer than the similar casing of the low-clearance tractor, thus providing a substantial distance between the bottom of the transmission case and the axial line of the sprocket wheel. However, casing 23¹ is attached to the transmission case in the same manner as the casing for the low-clearance tractor, and can be substituted readily therefor.

Pinion 38¹ of the high-clearance tractor is positioned the same distance from the axis of drive shaft 6 as in the low-clearance tractor. It is to be noted that in the high-clearance tractor, stub shaft 31¹ is supported entirely in casing 23¹, by bearings 36¹ in which the stub shaft is journaled; the inner bearing 36¹ being mounted in bushing 201 seated in casing 23¹. Cover 26¹, of the final drive gear housing, is secured to the casing 23¹ and extends to a position below stub shaft 31¹.

Mounted in the casing 23¹ and cover 26¹ is a shaft 202, carrying spaced bearings 203, upon which are journaled idler gear 204 and pinion 206 adjacent the gear, both of which are integrally formed on hub 207. The gear 204 meshes with pinion 38¹ and pinion 206 meshes with final drive gear 39¹, which is dished outwardly in contradistinction to the inward dishing of the similar gear for the low-clearance tractor. Since the idler gear structure 204 and 206 is interposed between pinion 38¹ and final drive gear 39¹, cross shaft 11 and gear 17 are mounted in a reverse position as previously pointed out, to drive normally final drive gear 39¹ in the same direction as it is driven in the low-clearance tractor. A fixed shaft 208, passing through the final drive gear housing, provides a mounting and a pivot for the truck frame on the housing. The details of this structure will be described in connection with the truck frame construction.

Final drive gear 39¹ is secured to a circular flange 209 (Figs. 3 and 16) of a quill 210, which projects out of the final drive gear housing. The quill is formed with an inwardly-projecting hub 211 journaled in bearing 212, mounted in cage 213 integral with casing 23¹; the cage being reinforced by webs 214 also integral with the casing. Also, the quill is journaled in a suitable bearing at its outer end, to be later described in connection with the truck frame. It is to be observed, from Figs. 3 and 16, that quill 210 is spaced from the fixed or stationary shaft 208.

Sprocket wheel 51¹ is splined to the quill 210; suitable seals 216 being provided adjacent the sides of the sprocket wheel to preclude the entrance of dirt into the final drive gear housing.

Truck frame and track

Figure 9:
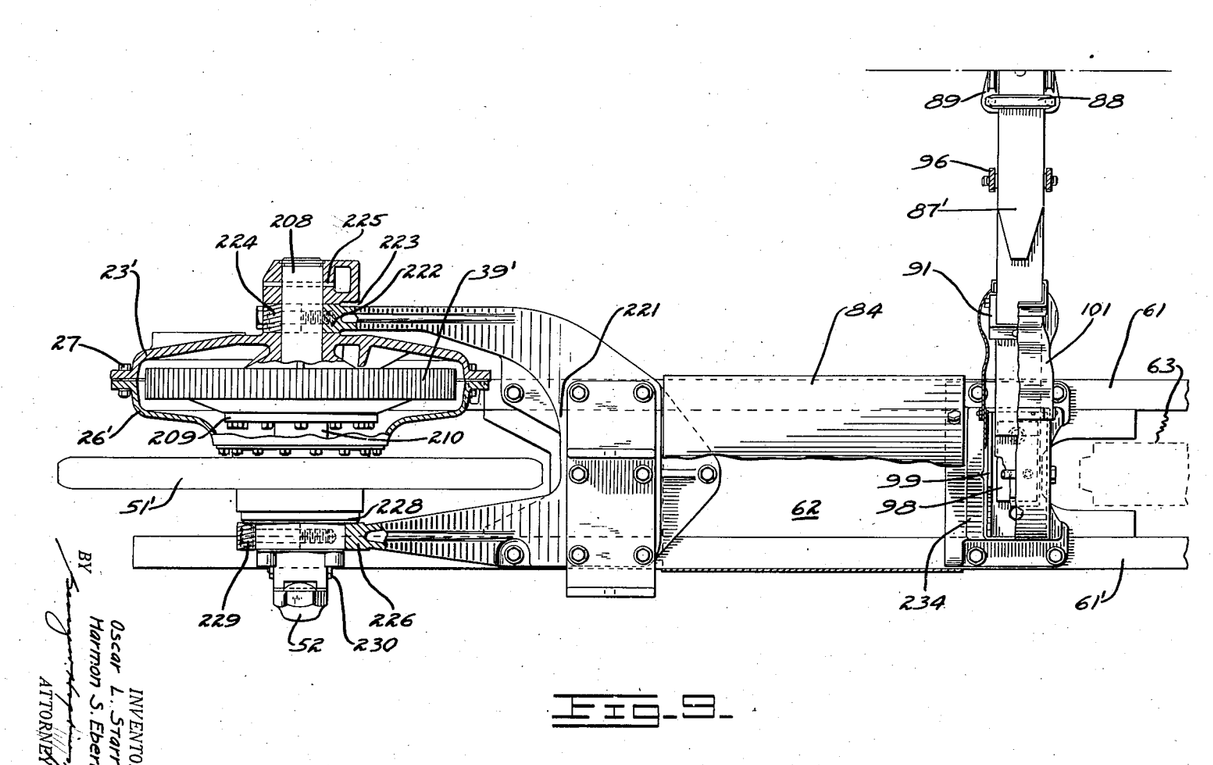
Fig. 9 is a plan view, partly in section, illustrating the truck frame mounting of the high-clearance tractor. Part of the structure is omitted to disclose the construction.

In the truck frame (Figs. 3 and 9) of the high-clearance tractor, the outer side channel 61¹ is of greater length than the corresponding channel of the low-clearance tractor, and is also longer than the inner channel of the truck frame. An integral yoke or fork member 221 is mounted rigidly on the truck frame adjacent the rear end. Inner arm 222 of the yoke overhangs the inner side of the truck frame, and projects rearwardly, into a suitable recess 223 formed in the bottom of casing 23¹. It is pivoted on the fixed shaft 208 by cap 224 secured thereto and forming a bearing therewith. The fixed shaft is restrained against movement by dowel pin 225, extending into the casing. Outer arm 226 (Fig. 1) of the yoke extends along the outer side channel 61¹ and rests, at its rear end, upon the channel. With particular reference to Figs. 3 and 16, the quill 210 is journaled, adjacent its outer end, in bearing 227 mounted in the stepped cage 228; upon which cage is pivoted outer arm 226 of the yoke, by cap 229 secured to the outer arm and forming a bearing therewith. Outer end of fixed shaft 208 extends through and is keyed to the interior of the cage; and the cage is split at its outer end to form a clamp 230 holding the shaft and cage together. A lock nut 231 bearing against the cage and threaded on shaft 208, holds the cage against bearing 227, in turn held by lock nut 232 threaded onto the quill; which lock nut 232 also holds sprocket wheel 51¹ on the quill 210. It is thus seen that the truck frame is pivoted about fixed shaft 208, adjacent each end of the yoke arms. Also, the fixed shaft is fixed on the final drive gear housing; and the fork or yoke is secured on the housing by virtue of inner arm 222 being held in recess 223.

The mounting of rollers 83 (Fig. 1), idler wheel 63, and the means for yieldingly maintaining the idler wheel, on the truck frame, is the same as that previously described.

Equalizer spring

The equalizer spring 87¹ (Fig. 6) is of the same general construction described in connection with the low-clearance tractor, and is mounted in the same manner. However, it is highly arched and is positioned on elevating blocks 234, secured to the truck frames, to provide for the high clearance adjacent the front end of the tractor substantially equal to the clearance adjacent the rear end of the tractor.

Discussion

Figure 6:
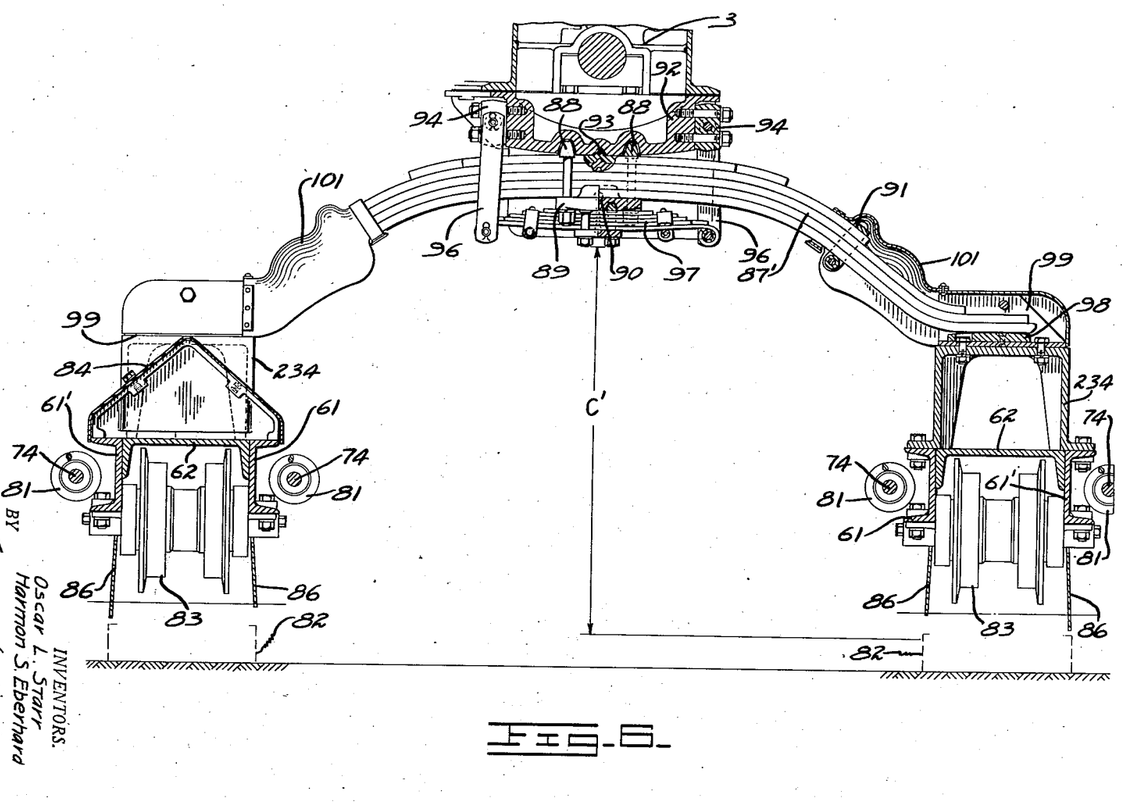
Fig. 6 is a sectional view, taken in a plane indicated by the line 6—6 in Fig. 1, illustrating the equalizer bar for the high-clearance tractor. Part of the structure is shown in elevation and portions thereof are omitted, for the purposes of illustration.

In the high-clearance tractor described, it is to be observed from Figs. 3 and 6 that the greatest clearance is along the longitudinal center line of the tractor, thus enabling the tractor to straddle a row of crops along the center line. This is quite advantageous in the case of the narrow-gauge tractor where it is desired to straddle only a single row of crops, such as corn or cotton. Our high-clearance tractor has a clearance sufficient to straddle practically all kinds of corn or cotton during their cultivation period; and its clearance at both the rear end of the transmission case and at the position of the equalizer bar is well over 17 inches, the minimum practical clearance for such crops. In actual dimensions, the clearance of our high-clearance tractor at the transmission case, (clearance being the vertical distance from the bottom of the track shoe where it contacts the ground to the lowermost point on the transmission case) is over 20 inches. This clearance is indicated by distance line C in Fig. 3. Line C¹ (Fig. 6) indicates the clearance of the equalizer spring, which is also over 20 inches.

Figure 8:
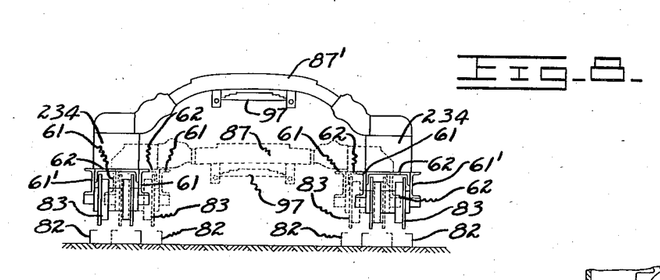
Fig. 8 is a schematic view, on a reduced scale, comparing the clearance of the low-clearance tractor (shown in dotted lines) and that of the high-clearance tractor.

In Fig. 8 is illustrated diagrammatically a comparison of the clearance, adjacent the equalizer spring, of both the low-clearance tractor and the high-clearance tractor. The clearance is more than doubled. This comparison can also be obtained from Figs. 6 and 7 drawn to the same scale; and the comparison adjacent the rear end of the transmission case can be obtained from Figs. 3 and 11, drawn to the same scale as Figs. 6 and 7.

In both the previously described tractors, the top surfaces of the truck frames are the same distance above the ground, as can be seen from Fig. 8, and Figs. 6 and 7. The additional clearance, therefore, is not obtained by elevating the truck frame in the high-clearance tractor, but is obtained by the detachable adapter mechanism described. In this connection, it is to be noted that in the high-clearance tractor the bottom of the transmission case is elevated considerably above the rotational axis line of sprocket wheel 51¹ (Fig. 3), and is adjacent to a horizontal plane tangent to the top of final drive gear 39¹, so that the distance between the gear axis and the tractor torso is substantially equal to the radius of the final drive gear. In the low-clearance tractor, the bottom of the transmission case is substantially coplanar with the rotational axis line of the sprocket wheel (Fig. 11), but in the high-clearance tractor the bottom of the transmission case is substantially coplanar with the axis of idler gears 204 and 206.

The outward dishing of final drive gear 39¹ in the high-clearance tractor is an important feature, because this structure and also the relatively wide idler gear and pinion 204, 206, provide a sturdy construction capable of withstanding additional stresses imposed as a result of raising the center of gravity in the high-clearance tractor over that in the low-clearance tractor. This construction also enables increasing of the tractor gauge, as can be seen from Fig. 8, to maintain stability of the high-clearance tractor, which otherwise might be impaired by raising the center of gravity.

As previously pointed out, the truck frame of the high-clearance tractor is hinged about a line coaxial with the rotational axis of the final drive gear and sprocket wheel. The yoke or integrally formed fork 221 provides two hinge points, one on each side of the sprocket wheel. This effects a strong and sturdy construction, capable of withstanding hard usage to which a tractor is generally subjected. Furthermore, the provision of the two spaced hinge points or bearings at the sides of sprocket wheel 51¹ prevents lateral swinging of the front end of the truck frame, to maintain alignment thereof when the tractor is driven.

Utilizing the tractor torso, comprising the transmission case 2 and engine structure 3, as a base unit, it is seen from the preceding description that both types of tractors can be manufactured economically. Furthermore, the attachment or adapter mechanism can be employed to convert readily the low-clearance tractor to the high-clearance tractor or vice versa.

WIDE-GAUGE HIGH-CLEARANCE TRACTOR (SHEETS 11 AND 12) (251–299 SERIES NUMERALS)

As previously pointed out, the narrow-gauge high-clearance tractor is particularly adapted for straddling a single row of corn or cotton. It might be desirable under certain circumstances to straddle more than one row of such crops; and for this reason, we have provided adapter means whereby the narrow-gauge high-clearance tractor can be readily converted to a wider-gauge tractor. Also, this adapter mechanism can be employed for manufacturing, with the tractor torso or backbone unit as a base, the wider-gauge tractor as well as the narrow-gauge tractor.

Figures 14, 15:
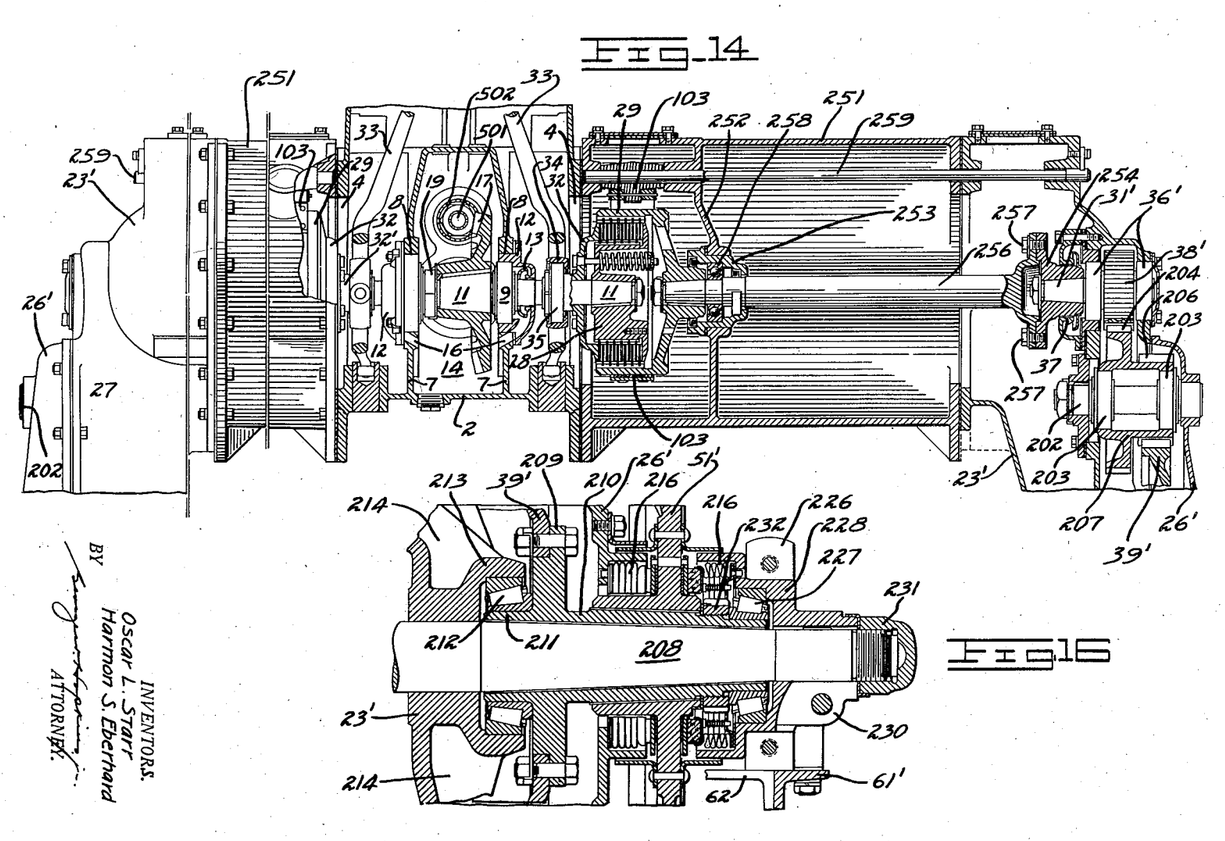
Fig. 14 is a fragmentary vertical sectional view, partly in elevation, illustrating the spacer housing for adapting a narrow-gauge tractor to a wider-gauge tractor. The view is of the high-clearance tractor.
Fig. 15 is a fragmentary sectional elevation, illustrating the equalizer spring for the high-clearance and widened gauge tractor of Fig. 14.
Figure 15:
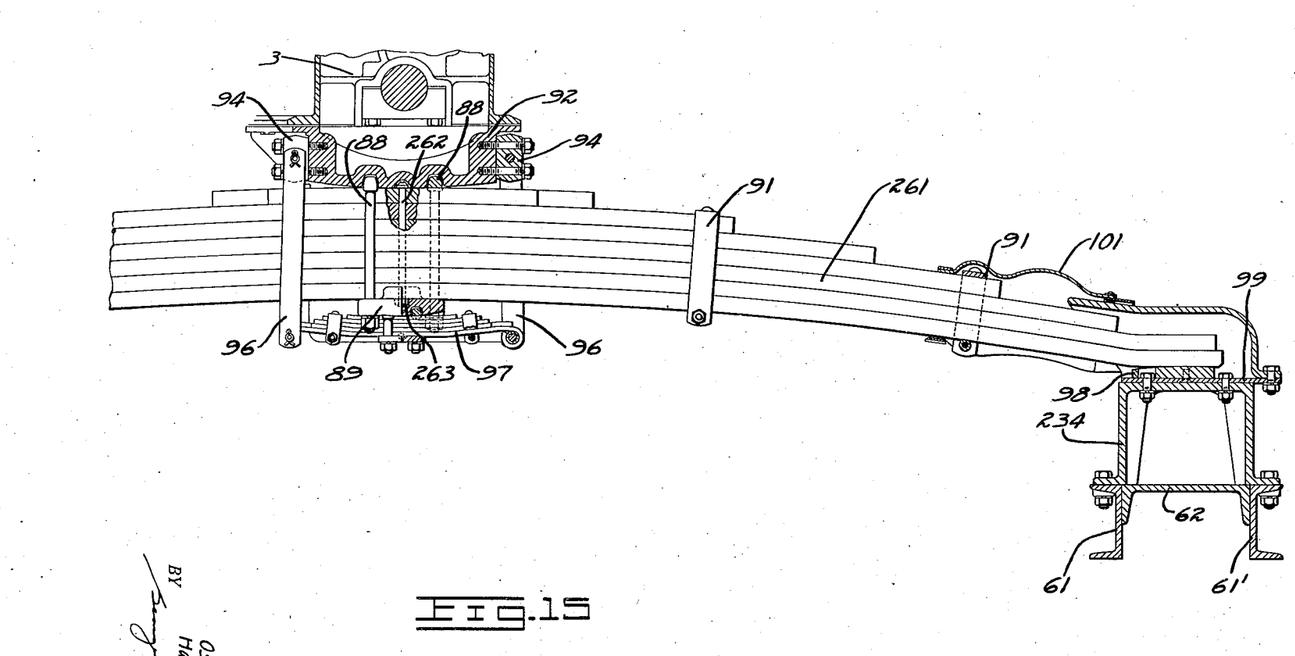

In Fig. 14, is shown the adapter mechanism for widening, adjacent the rear end of the transmission case, the gauge of the high-clearance tractor. This means comprises a tubular spacer housing 251 having vertical reinforcing web 252, in which is mounted a bearing cage 253. One end of this housing is secured directly to transmission case 2, in place of the final drive gear housing which is secured directly to the transmission case in the narrow-gauge high-clearance tractor. The final drive gear housing and assembly, which is of the same construction as in the narrow-gauge high-clearance tractor, is secured directly to the other end of the spacer housing.

Instead of stub shaft 31¹ carrying clutch member 29 as in the narrow-gauge high-clearance tractor, a flanged hub 254 is keyed to the stub shaft 31¹; and an elongated coupling shaft 256, extending into spacer housing 251, is secured at its outer end by screws 257 to the hub 254. Inner end of shaft 256 is journaled in bearing 258, mounted in cage 253; and at this end is keyed clutch member 29 which coacts with clutch member 28 in the manner previously described. In the wider-gauge tractor, a longer brake operating rod 259, for the clutch brake 103, is necessarily employed. This rod extends through spacer housing 251 and beyond the outer side of the final drive gear housing.

Fig. 15 illustrates the equalizer spring and mounting therefor, for the wider-gauge high-clearance tractor. The positioning of the ends of spring 261 on elevating blocks 234 is the same as that described in the narrow-gauge high-clearance tractor. Also, the mounting of the central part of the spring under the tractor is substantially the same as that previously described. The spring 261 is longer than the highly-arched spring of the narrow-gauge tractor, and is made heavier and thicker than the latter spring. Instead of preventing lateral shifting of the leaves by dovetails 93, the leaves of spring 261, which are also heavier and thicker than those in the previously described equalizer spring, are held by means of pin 262 passing therethrough and secured by nut 263 on the under side of the spring.

From the preceding description, it is seen that the narrow-gauge high-clearance tractor can be readily changed to the wider-gauge tractor by interposing and securing spacer housings 251 between the transmission case 2 and the final drive gear housings, and by substituting the wider and heavier equalizer spring for the other spring. Also, since the wider-gauge tractor utilizes the same torso as in the other tractors, the facility with which these tractors can be directly manufactured is apparent.

Suitable drawbar means is also provided on the tractor. These drawbar means, as disclosed in Fig. 1, includes a support 301 secured to the underside of the transmission casing and which extends downwardly at an angle toward the front end of the tractor. A pair of spaced horizontal flanges 304 is integrally formed at the bottom of support 301, between which drawbar 306 is pivoted in any suitable way. Drawbar 306 is formed at its rear end with the usual fork 316, provided with the usual removably mounted cotter-held pin 317 for attachment to the load. Tie rods 326 removably secured to ears 328 on support 301 and to the final drive housing of the tractor serve to reinforce the structure.

Suitable means are also provided for enabling power to be taken off from the tractor for the operation of any mechanism which may be associated with the tractor. With particular reference to Figs. 3, 5, 11 and 14, a shaft 501 is journalled in bearing 502 mounted on partition wall 503 of transmission case 2. Shaft 501 is driven directly from the engine and is positioned above drive shaft 6 carrying pinion 18, which meshes with the bevel gear 17 keyed to cross shaft 11. Drive shaft 6 is rotated from shaft 501, by the usual speed change transmission gearing (all of which is not shown) including gear 504 mounted on drive shaft 6 and shiftable gearing 506 splined on shaft 501. Shaft 501 has at its rear end a splined portion 507 to which any suitable power take-off mechanism may be detachably connected in a known manner.

*Conclusion*

From the foregoing description, it is seen that we have provided a tractor torso which can be utilized as a base for manufacturing various types of tractors including the high-clearance tractor; and that the manufacture of the high-clearance tractor is facilitated by the adapter mechanism described. The high-clearance tractor is particularly adapted for use with cultivators for working row crops and the like, as well as for other purposes where high clearance and/or wide gauge features are desirable.

We, therefore, claim as our invention:

1. In a high-clearance track-type tractor, a body unit, spaced truck frames between which the body unit is located, a wheel at each side of the body unit, housings connected to said body unit adjacent the rear end thereof and to said truck frames, said housings elevating the rear of said body unit above the rotational axes of said wheels, and elevating means for the front of said body unit comprising elevating blocks on said truck frames and equalizer means supported by said blocks.

2. In a high-clearance track-type tractor, a body unit, spaced truck frames between which the body unit is located, a wheel at each side of the body unit, housings connected to said body unit adjacent the rear end thereof and to said truck frames, said housings elevating the rear of said body unit above the rotational axes of said wheels, and elevating means for the front of said body unit comprising elevating blocks on said truck frames and an arched equalizer spring extending transversely of said body unit and mounted on said blocks.

3. In a high-clearance track-type tractor; a tractor body; a truck frame at each side of said body; an endless track about each truck frame; a drive gear associated with each truck frame; and means for elevating the body above the rotational axis of said gear, including a housing for the drive gear, and a spacer housing attached to the tractor body and to the drive gear housing; said spacer and gear housings being interposed between said body and the associated truck frame.

4. In a high-clearance track-type tractor; a tractor torso; a drive gear; means for elevating the torso above the rotational axis of said gear, including a housing for the drive gear, and a spacer housing attached to the tractor torso and to the drive gear housing; and means for rotating the drive gear comprising a shaft in said torso, a shaft in said drive gear housing, and a coupling shaft in the spacer housing and connected to the other shafts.

5. A high-clearance track-type tractor comprising a body unit, spaced truck frames between which the body unit is located, a drive wheel at each side of the body unit, supporting means connected to said body unit adjacent the rear thereof and to said truck frames for elevating the rear of said body unit above the rotational axes of said wheels, and elevating means for the front of said body unit; said elevating means including transversely extending motion controlling means for said truck frames, and means mounting the ends of said motion controlling means in an elevated position on said truck frames.

6. A high-clearance track-type tractor comprising a body unit, spaced truck frames between which the body unit is located, a drive wheel at each side of the body unit, housings connected to said body unit adjacent the rear thereof and to said truck frames, said housings elevating the rear of said body unit above the rotational axes of said wheels, and elevating means for the front of said body unit including an arched equalizer member extending transversely of said body unit and having its ends supported by said truck frames.

7. A high-clearance track-type tractor comprising a body unit, spaced truck frames between which the body unit is located, a drive wheel at each side of the body unit, elongated housings connected to said body unit adjacent the rear thereof and to said truck frames, said housings providing weight transmitting connections from said body unit to said truck frames and elevating the rear of said body unit above the rotational axes of said wheels, drive connections from said body unit to said wheels enclosed within said housings, and elevating means for the front of said body unit; said elevating means including transversely extending motion controlling means for said truck frames mounted in elevated position on said truck frames.

8. A high-clearance track-type tractor comprising a body unit, spaced truck frames between which the body unit is located, a wheel at each side of the body unit, elongated housings connected to said body unit adjacent the rear thereof and to said truck frames, said housings providing weight transmitting connections from said body unit to said truck frames and elevating the rear of said body unit above the rotational axes of said wheels, drive connections from said body unit to said wheels enclosed within said housings, and elevating means for the front of said body unit including an arched equalizer member extending transversely of said body unit and having its ends supported by said truck frames.

9. A high-clearance track-type tractor comprising spaced truck frames, a tractor body, driving means associated with said body including a rotatable drive element adjacent each side thereof, means for supporting the rear of said body in elevated position above said truck frames comprising an elongated housing secured to said body adjacent each side thereof and hingedly connected to an associated truck frame, a drive sprocket associated with each housing and supported for rotation about an axis adjacent the lower end of such housing, a drive element rotatable with each sprocket and enclosed by the associated housing, said housings being of a length to space the lower surface of said body a substantial distance above the axes of rotation of said drive sprockets, a drive connection in each housing interposed between the drive elements associated with such housing, and motion controlling mechanism for said truck frames constructed to support the front of said body in the elevated position on said truck frames.

10. A high-clearance track-type tractor comprising spaced truck frames, a tractor body, driving means associated with said body including a rotatable drive gear adjacent each side of said body and positioned above the lower surface of such body, means for supporting the rear of said body in elevated position above said truck frames comprising an elongated housing secured to said body adjacent each side thereof to enclose the drive gear at such side and hingedly connected to an associated truck frame, a drive sprocket associated with each housing and supported for rotation about an axis adjacent the lower end of such housing, a drive gear rotatable with each sprocket and enclosed by the associated housing, said housings being of a length to space the lower surface of said body a substantial distance above the axes of rotation of said drive sprockets, gear means within each housing between and intermeshing with the drive gears associated with such housing, and motion controlling mechanism for said truck frames constructed to support the front of said body in the elevated position on said truck frames.

11. A high-clearance track-type tractor comprising a body unit; spaced truck frames between which the body unit is located; means supporting the rear of said body unit in an elevated position above said truck frames with each of said truck frames hingedly connected to said body unit for relative oscillatory movement; and means for supporting the front of said body unit in an elevated position on said truck frames and for controlling the oscillatory movements of said truck frames comprising mechanism extending transversely of said body unit and supported in elevated position by said truck frames.

12. A high-clearance track-type tractor comprising a body unit; spaced truck frames between which the body unit is located; means supporting the rear of said body unit in an elevated position above said truck frames with each of said truck frames hingedly connected to said body unit for relative oscillatory movement; and means for supporting the front of said body unit in an elevated position on said truck frames and for controlling the oscillatory movements of said truck frames comprising mechanism extending transversely of said body unit, and means interposed between each truck frame and each end of said mechanism for elevating each of said mechanism ends above the associated truck frame.

13. A high-clearance track-type tractor comprising a tractor body, spaced truck frames between which the body is located, means including final drive housings enclosing driving mechanism from said body for supporting said body at one location in an elevated position above said truck frames with the truck frames movably connected to said final drive housings for oscillatory movement with respect to said body, and means for supporting the body at another location in said elevated position and for controlling the movements of said truck frames comprising mechanism extending transversely from beyond opposite sides of said body and having an elevated support by said truck frames.

14. A high-clearance track-type tractor comprising a tractor body, spaced truck frames between which the body is located, final drive housing means connected to said body at one location adjacent each side thereof, a wheel associated with each final drive housing means, said final drive housing means having connections with said truck frames for oscillating movement of said truck frames with respect to said body and elevating said body above the rotational axes of said wheels, drive connections from said body to said wheels enclosed within said final drive housing means, and means for supporting the body at another location in said elevated position and for controlling the movements of said truck frames comprising mechanism extending transversely from beyond opposite sides of said body and having an elevated support by said truck frames.

OSCAR L. STARR.
HARMON S. EBERHARD.